United States Patent
Kreuzweger

(10) Patent No.: US 10,279,820 B2
(45) Date of Patent: May 7, 2019

(54) SPRING LOCK FOR SECONDARY SPRING

(75) Inventor: David Kreuzweger, Graz (AT)

(73) Assignee: Siemens AG Oesterreich, Vienna (AT)

( * ) Notice: Subject to any disclaimer, the term of this patent is extended or adjusted under 35 U.S.C. 154(b) by 0 days.

(21) Appl. No.: 14/241,518

(22) PCT Filed: Aug. 6, 2012

(86) PCT No.: PCT/EP2012/065314
§ 371 (c)(1),
(2), (4) Date: Feb. 27, 2014

(87) PCT Pub. No.: WO2013/029924
PCT Pub. Date: Mar. 7, 2013

(65) Prior Publication Data
US 2014/0306387 A1    Oct. 16, 2014

(30) Foreign Application Priority Data
Aug. 30, 2011 (AT) .................. A 1239/2011

(51) Int. Cl.
*F16F 1/371* (2006.01)
*B61F 5/06* (2006.01)
(Continued)

(52) U.S. Cl.
CPC .................. *B61F 5/06* (2013.01); *B61F 5/08* (2013.01); *B61F 5/10* (2013.01); *F16F 1/371* (2013.01); *F16F 2230/0041* (2013.01)

(58) Field of Classification Search
CPC ......... F16F 2230/0031; F16F 2224/025; F16F 2230/0058; F16F 2234/04; F16F 1/371; F16F 1/3713; F16F 1/3716; F16F 1/373; B60G 99/004; B60G 11/22; B60G 2204/125; B61F 5/08; B61F 5/305; B61F 5/142; B61F 5/148; F16B 37/16
See application file for complete search history.

(56) References Cited

U.S. PATENT DOCUMENTS

| 1,689,921 A | 10/1928 | Helmstein |
| 1,813,706 A * | 7/1931 | Lewis ............... B61F 5/08 105/198.7 |

(Continued)

FOREIGN PATENT DOCUMENTS

| CN | 1788171 A | 6/2006 |
| CN | 201472404 U | 5/2010 |

(Continued)

OTHER PUBLICATIONS

Machine translation of KR 10-2011-0133971 (no date).*
Machine translation of FR 2354229 (no date).*
Machine translation of CN 102114852 (no date).*

*Primary Examiner* — Nicholas J Lane
(74) *Attorney, Agent, or Firm* — Laurence Greenberg; Werner Stemer; Ralph Locher

(57) ABSTRACT

A spring lock for a secondary spring that is arranged between the car body and the under frame of a rail vehicle. A spring locking element is provided which in the mounted state is supported on the car body and projects through a cutout and is connected to the secondary spring in such a way that it is prevented from extending. This facilitates the mounting of anti-wear washers under the secondary spring to a considerable degree.

9 Claims, 4 Drawing Sheets

(51) Int. Cl.
  *B61F 5/08* (2006.01)
  *B61F 5/10* (2006.01)

(56) References Cited

U.S. PATENT DOCUMENTS

| | | | |
|---|---|---|---|
| 2,056,222 A * | 10/1936 | Wright | B61F 5/142 |
| | | | 105/200 |
| 2,108,124 A | 5/1938 | Hobson | |
| 2,119,062 A * | 5/1938 | Stout | B61F 5/08 |
| | | | 105/190.2 |
| 2,305,427 A * | 12/1942 | Joachim | F16B 37/16 |
| | | | 411/409 |
| 2,674,449 A * | 4/1954 | Tucker | B61F 5/08 |
| | | | 105/198.7 |
| 2,698,208 A * | 12/1954 | Dilg | B61F 5/142 |
| | | | 105/199.3 |
| 4,723,491 A * | 2/1988 | von Madeyski | B61F 5/08 |
| | | | 105/198.7 |
| 5,195,438 A * | 3/1993 | Dumoulin | B61F 5/14 |
| | | | 105/199.3 |
| 5,482,406 A | 1/1996 | Arlt, III | |
| 5,588,368 A | 12/1996 | Richter et al. | |
| 5,611,284 A * | 3/1997 | Smith | B61F 5/305 |
| | | | 105/218.1 |
| 2005/0183624 A1 | 8/2005 | Hommen et al. | |
| 2006/0170140 A1 | 8/2006 | Menk et al. | |

FOREIGN PATENT DOCUMENTS

| | | | |
|---|---|---|---|
| CN | 201646754 U | 11/2010 | |
| CN | 102114852 A | 7/2011 | |
| DE | 459092 C | 4/1928 | |
| DE | 1139867 | 11/1962 | |
| DE | 10050067 C2 | 2/2003 | |
| EP | 0229930 A2 | 7/1987 | |
| EP | 0254084 A1 | 1/1988 | |
| FR | 2354229 A1 * | 1/1978 | B61F 5/08 |
| GB | 822285 A * | 10/1959 | B61F 5/32 |
| KR | 20110133971 A | 12/2011 | |
| RU | 2132791 C1 | 7/1999 | |
| SU | 35874 A1 | 4/1934 | |

* cited by examiner

SPRING LOCK FOR SECONDARY SPRING

BACKGROUND OF THE INVENTION

Field of the Invention

The invention relates to a spring lock for a secondary spring which is arranged between the car body and the underframe of a rail vehicle.

With rail vehicles, the wheel wear results in a reduction in the height of the position of the car body.

Upon entry into a station, it may therefore occur that the level of a floor arranged in the car body comes to rest below the floor level of the station. The level difference between the station and the upper edge of the floor of the car body may result in the formation of a step in the transition region between the rail vehicle and the station. These steps pose a significant safety risk for passengers, therefore in accordance with the prior art, this loss of height on account of wheel wear is compensated for in that the car body is raised compared with the underframe, an undercarriage or pivoted bogie. To this end anti-wear washers in the form of metal or plastic disks are inserted below the secondary springs supporting the car body.

For assembly of the anti-wear washers, the car body must be raised in a workshop to such an extent that the secondary spring detaches from the underframe. To this end, the connections between the car body and the underframes, such as cables or hoses, and the lift lock of the spring, must be disassembled. This is associated with significant effort. The object underlying the invention is therefore to reduce this outlay.

BRIEF SUMMARY OF THE INVENTION

In accordance with the invention, this takes place with a spring lock for a secondary spring arranged between the car body and the underframe of a rail vehicle, characterized in that a spring locking element is provided, which in a mounted state rests on the car body and projects through a cutout and is connected to the secondary spring in such a way that it is prevented from extending.

According to the invention, upon assembly of anti-wear washers prior to raising the car body, the secondary springs are locked in the compressed state with the spring locking element. When raising the car body, the secondary spring can therefore no longer extend, and thus detaches immediately from its restraint. On account of the lesser need for lifting of the car body, the connections between car body and underframe, such as cables or hoses, and the lift lock of the spring do not now need to be disassembled, thereby avoiding the significant outlay associated therewith.

The invention is suited to different secondary spring embodiments. It can be used particularly advantageously if the secondary spring is a conical spring, if necessary embodied in several parts, which is connected via a spring retainer to the car body.

The invention can however also be used advantageously as secondary springs in the case of pneumatic springs 12 and helical springs 13.

A particularly advantageous embodiment of the invention is then also obtained if the spring locking element has an at least approximately cylindrical shaft with a T-handle on its upper end and if the shaft has a thread on its lower end, and that a supporting element is fixed on the shaft and that the spring locking element is screwed by means of thread, in the mounted state, to a corresponding counterpart of the secondary spring.

The spring locking element is thus particularly easy to handle, no additional tool for fastening purposes is required.

A bayonet coupling or a latch can be provided as an alternative to a screw connection.

Furthermore, an additional safety aspect is fulfilled in that the spring locking element projects from the base of the car body and monitoring is thus easily enabled to determine whether, after concluding the assembly work, the spring locking elements have also been removed again.

BRIEF DESCRIPTION OF THE SEVERAL VIEWS OF THE DRAWING

The invention is described in more detail with the aid of the Figures, in which, by way of example

DESCRIPTION OF THE INVENTION

Figure 1:
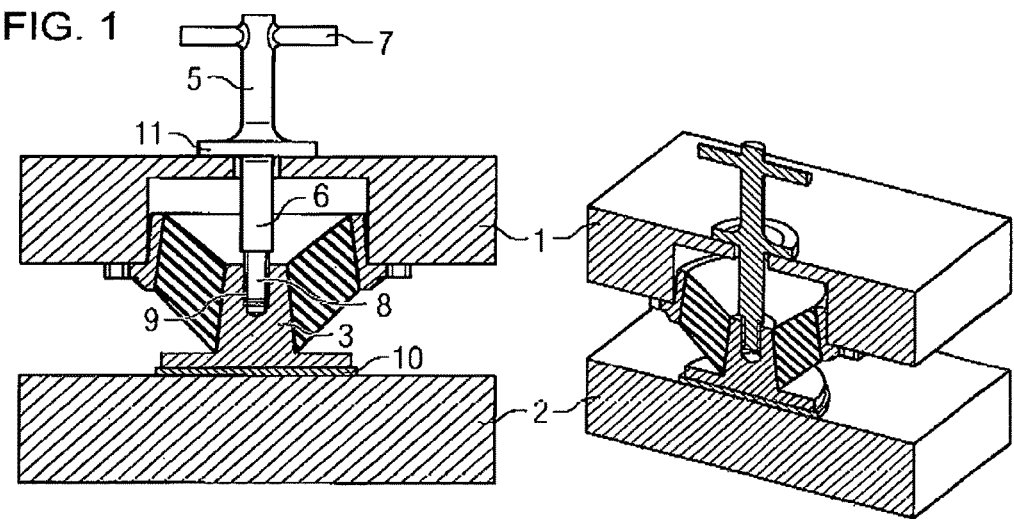
FIG. 1 shows an inventive spring lock with a conical spring as a secondary spring in a first preferred embodiment

The representation according to FIG. 1 shows a section of a car body 1 and an underframe 2, in other words undercarriage or pivoted bogie of a rail vehicle. A conical spring is arranged as a secondary spring 3 between the two. It is to be noted that the number of secondary springs 3 can vary between car body 1 and underframe 2, typically for instance two or four springs.

A cutout which can be closed in the operating state is provided above each secondary spring 3 in the car body 1, through which the cylindrical shaft 6 of the spring locking element 5 projects in the assembled state. In the car body 1 itself, the spring locking element 5 with its upper end of the cylindrical shaft 6 and the T-handle 7 projects from the base and is thus easily visible. It is thus possible to very easily monitor whether the locking of the secondary springs 3 has taken place, or whether this was also released again after conclusion of the assembly work.

Figure 7:
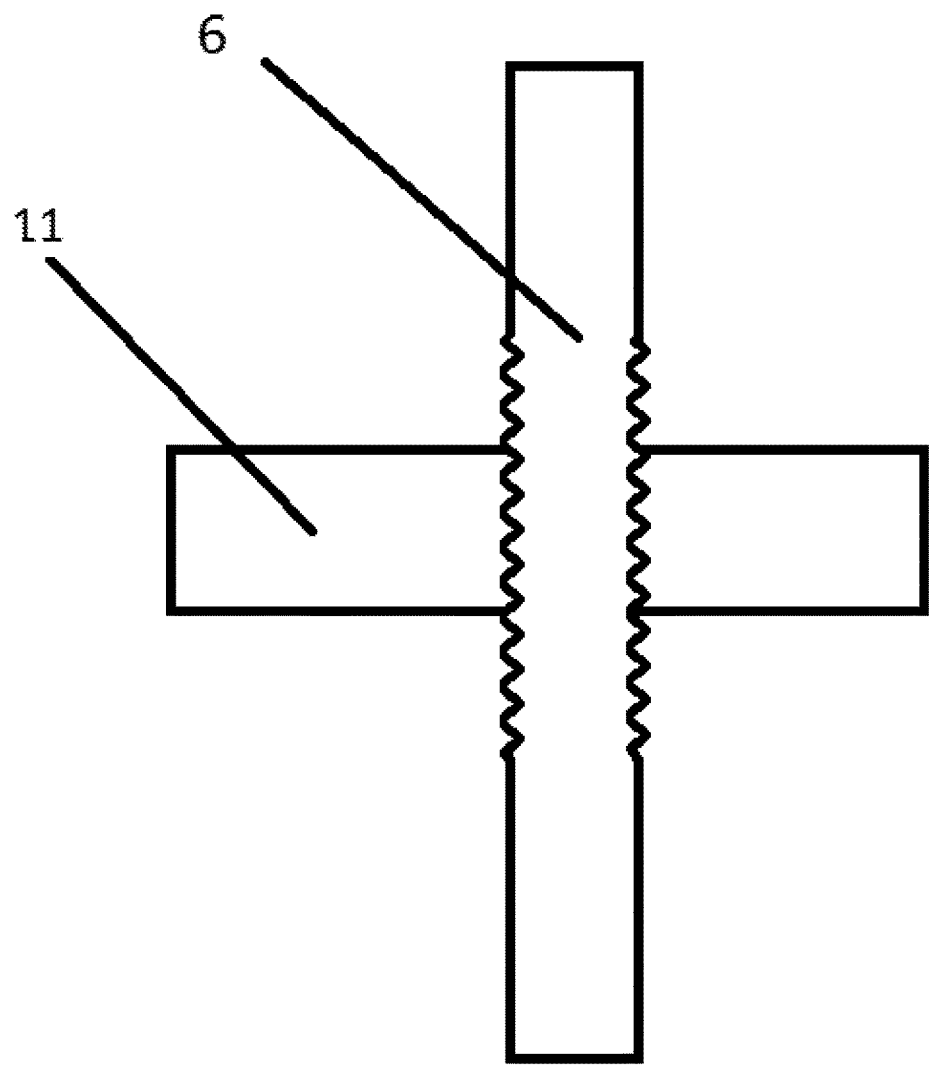
FIG. 7 is a sectional view of a part of the spring lock showing a supporting element fixed to a thread of a shaft.

The cylindrical shaft 6 has a thread 8 on its lower end, which is screwed to a corresponding counterpart 9 of the secondary spring 3. In addition, a plate-type supporting element 11 is fixed at a suitable height to the cylindrical shaft 6, said supporting element 11 being supported against the car body 1 and/or a suitable brace of the same and thus prevents a downward displacement of the spring locking element 5. It is also expedient here if the supporting element 11 can be fastened to the Cylindrical shaft 6 at different positions and can thus be adjusted to different requirements with different spring forms for instance. This can take place for instance by means of a further thread on the cylindrical shaft 6, as a result of which a continuous adjustment of the height of the plate-type supporting element 11 is enabled, see FIG. 7.

After screwing the spring locking element 5 to the secondary spring 3, the car body 1 can now be raised and the anti-wear washers 10 attached below the secondary springs 3.

Alternatively to a spring, the approximately cylindrical shaft 6 of the spring locking element 5 can have a bayonet coupling or also for instance a claw fastener on its lower end, by means of which the spring locking element 5 in the mounted state is connected to a corresponding counterpart of the secondary spring 3.

Figure 2:
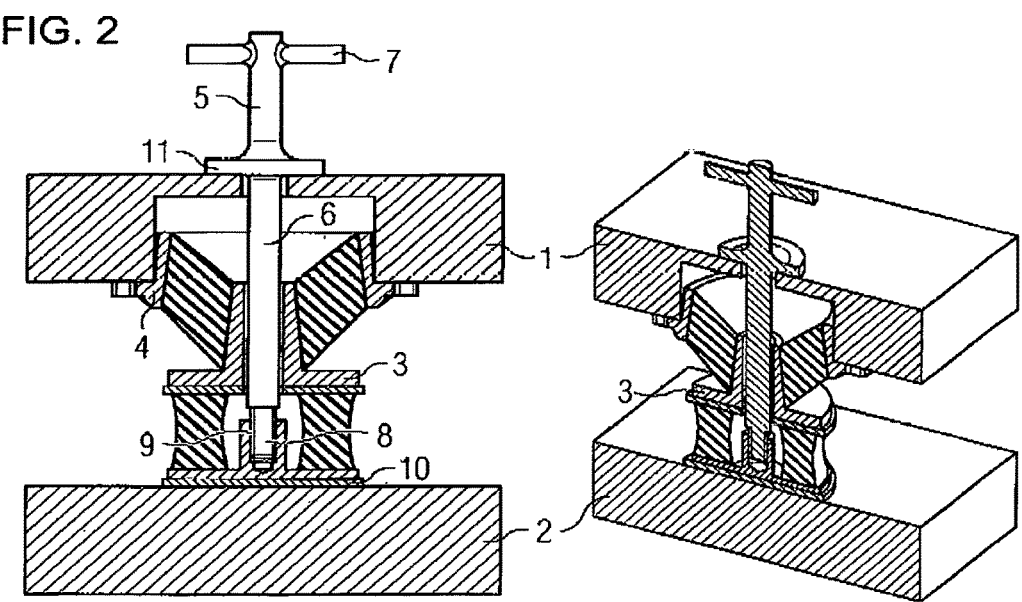
FIG. 2 shows a spring lock with a conical spring as a secondary spring in a second preferred embodiment.

FIG. 1 shows a conical spring as a secondary spring 3 in a first one-piece embodiment, the invention can however similarly be deployed in secondary springs with other embodiments, such as for instance in a multipart secondary spring 3, as shown in FIG. 2.

The invention can equally also be used in pneumatic springs 12 and helical springs 13 as secondary springs, such as is shown in FIGS. 3, 4, 5 and 6.

Figure 3:
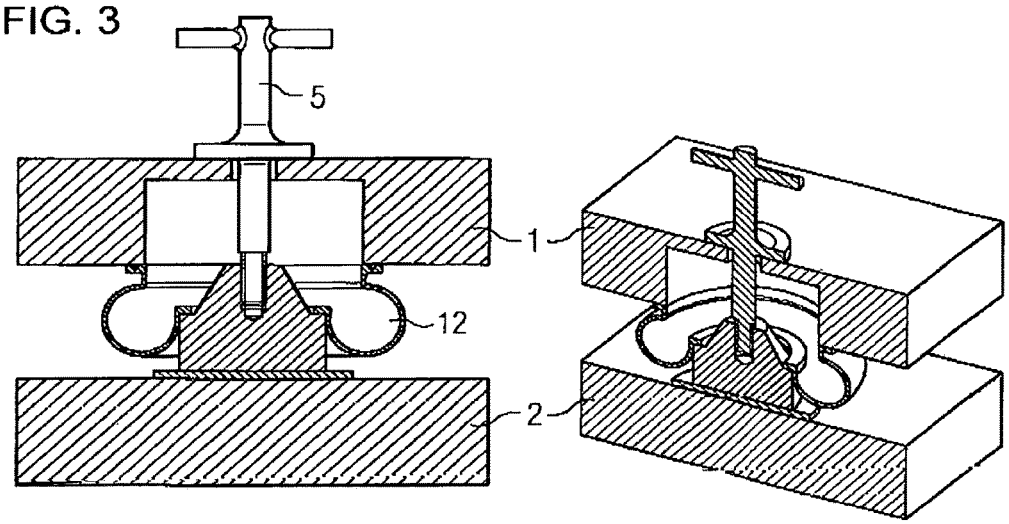
FIG. 3 shows an inventive spring lock with a pneumatic spring as a secondary spring in a first preferred embodiment
Figure 4:
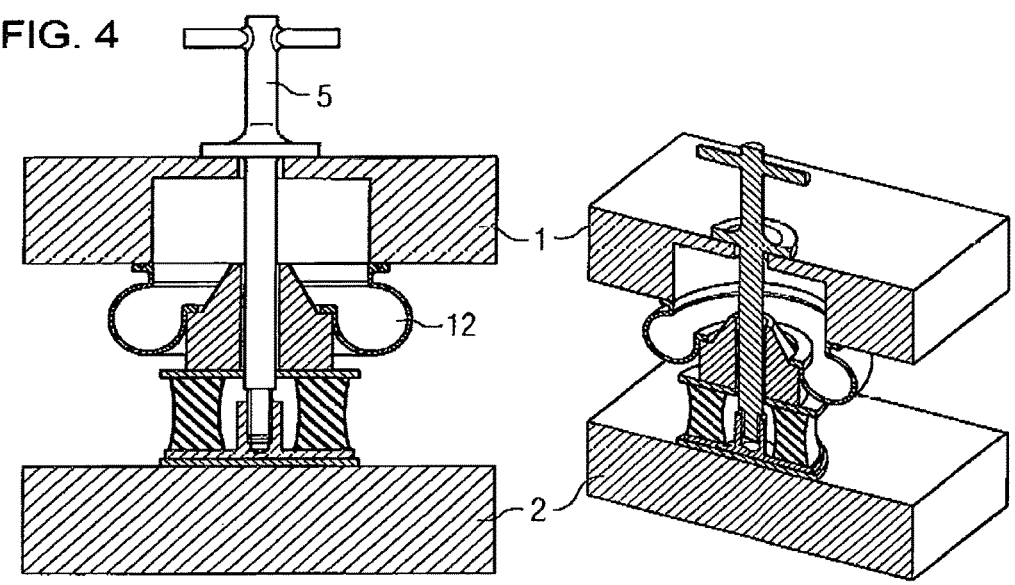
FIG. 4 shows a spring lock with a pneumatic spring as a secondary spring in a second preferred embodiment.
Figure 5:
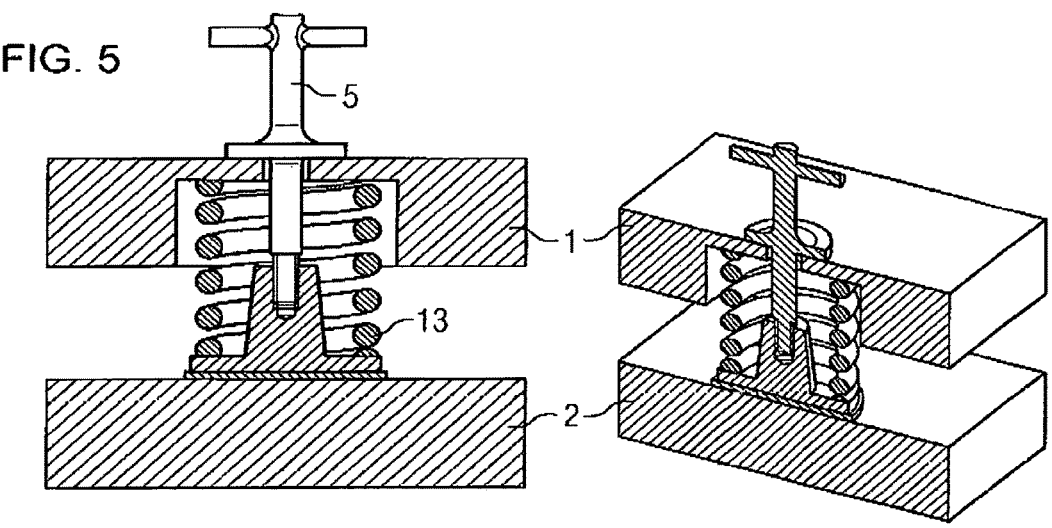
FIG. 5 shows an inventive spring lock with a helical spring as a secondary spring in a first preferred embodiment

With pneumatic springs 12 according to the schematic representations in FIG. 3 and FIG. 4, it is expedient to provide the ventilated space on the top side with a tight closure, which is opened, if necessary, in order to connect the spring locking element 5 to the pneumatic spring 12.

It is likewise possible to rotate the system, to clamp the spring 3, 12, 13 (conical, pneumatic or helical spring) to the underframe 2, and after raising the car body 1 to place the anti-wear washers 10 on the top side of the spring between the spring and the car body 1.

It is expedient for many application areas if the secondary spring 3, 12, 13 is configured in several parts.

Figure 6:
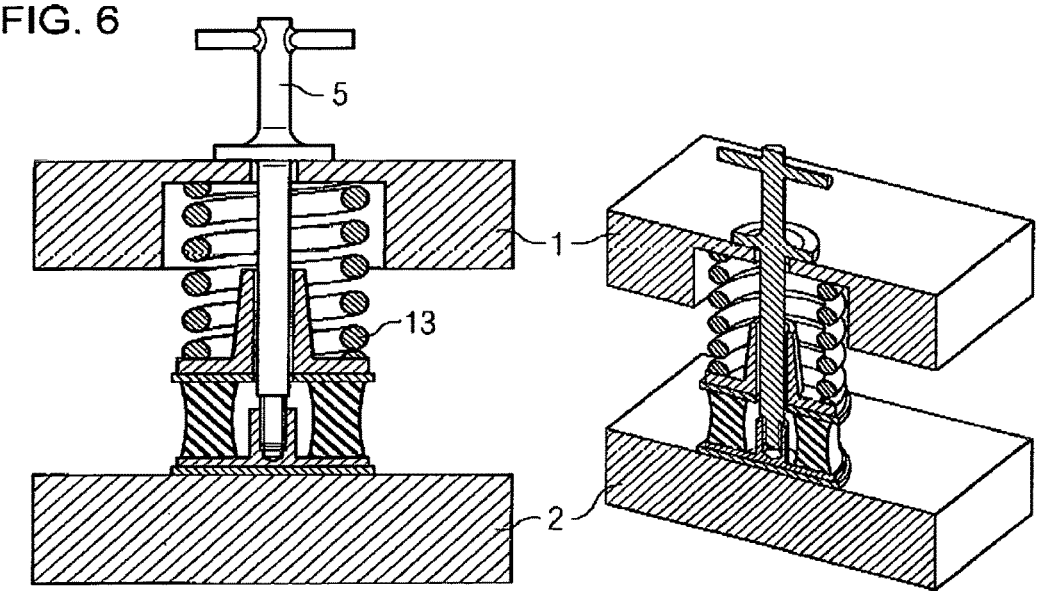
FIG. 6 shows a spring lock with a helical spring as a secondary spring in a second preferred embodiment.

This multipart structure can include the combination of a conical spring with a rubber spring for instance, as shown in FIG. 2, further expedient variants are also the combination of a pneumatic spring 12 with a rubber spring according to FIG. 4 and the combination of helical spring 13 and rubber spring according to FIG. 6.

With these combinations, it may be advantageous only to lock one part, preferably the softer part of the spring 3, 12, 13 by means of spring locking element 5.

For specific application cases, it may however also be advantageous to lock both parts.

LIST OF REFERENCE CHARACTERS

1. Car body
2. Underframe
3. Conical spring as secondary spring
4. Spring retainer
5. Spring locking element
6. Cylindrical shaft
7. T-handle
8. Thread
9. Counterpart
10. Anti-wear washer
11. Supporting element
12. Pneumatic spring
13. Helical spring

The invention claimed is:

1. A spring lock assembly, comprising:
a secondary spring disposed between a car body of a rail vehicle and a bogie pivotably mounted to the car body;
a washer; and
a spring locking element supported, in a mounted state thereof, on the car body or on a part that is fixedly connected to the car body respectively, by a supporting element fixed to a thread of a shaft of the spring locking element, said spring locking element projecting through a cutout in said car body and being connected to said secondary spring so as to prevent said secondary spring from expanding, and said spring locking element having a handle configured to enable said spring locking element to be pulled upward for raising said secondary spring and the car body to permit said washer to be inserted between said secondary spring and the bogie.

2. The spring lock assembly according to claim 1, wherein said secondary spring is a conical spring, and further comprising a spring retainer connecting said secondary spring to the car body.

3. The spring lock assembly according to claim 1, wherein said secondary spring is a pneumatic spring mounted to the car body.

4. The spring lock assembly according to claim 1, wherein said secondary spring is a helical spring mounted to the car body.

5. The spring lock assembly according to claim 1, wherein said secondary spring is a spring formed with a plurality of parts and wherein only one of said parts is blocked by said locking element.

6. The spring look assembly according to claim 5, wherein said plurality of parts includes a relatively softer part and said locking element is disposed to block only said relatively softer part.

7. The spring lock assembly according to claim 1, wherein:
said spring locking element includes a substantially cylindrical shaft with an upper end and a lower end, said handle being a T-shaped handle on said upper end, said supporting element fixed to said shaft and a threaded portion on said lower end; and
said spring locking element, in the mounted state thereof, is screwed by way of said thread to a corresponding counterpart of said secondary spring.

8. The spring lock assembly according to claim 1, wherein:
said spring locking element comprises a substantially cylindrical shaft with an upper end and a lower end, said handle being a T-shaped handle on said upper end and a bayonet coupling on said lower end; and
said supporting element is fixed to said shaft, and said spring locking element, in the mounted state thereof, is connected by way of said bayonet coupling to a corresponding counterpart of said secondary spring.

9. The spring lock assembly according to claim 1, wherein said spring locking element is configured for locking said secondary spring in a compressed state to permit the car body to be raised for insertion of said washer between said secondary spring and the bogie.

* * * * *